Feb. 24, 1959 D. J. REPICI 2,874,418
METHOD OF FABRICATION OF CONDENSER STRIP HYDROPHONES
Filed May 31, 1957
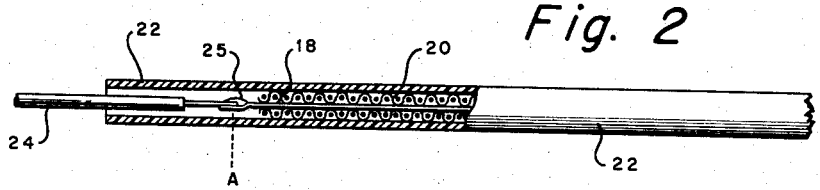
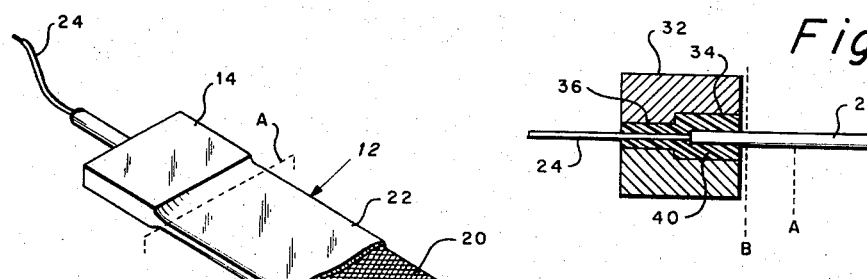
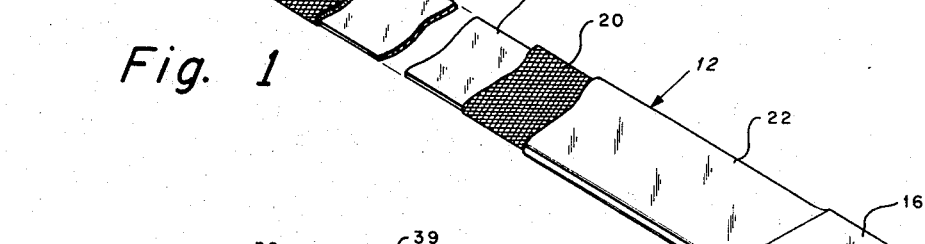
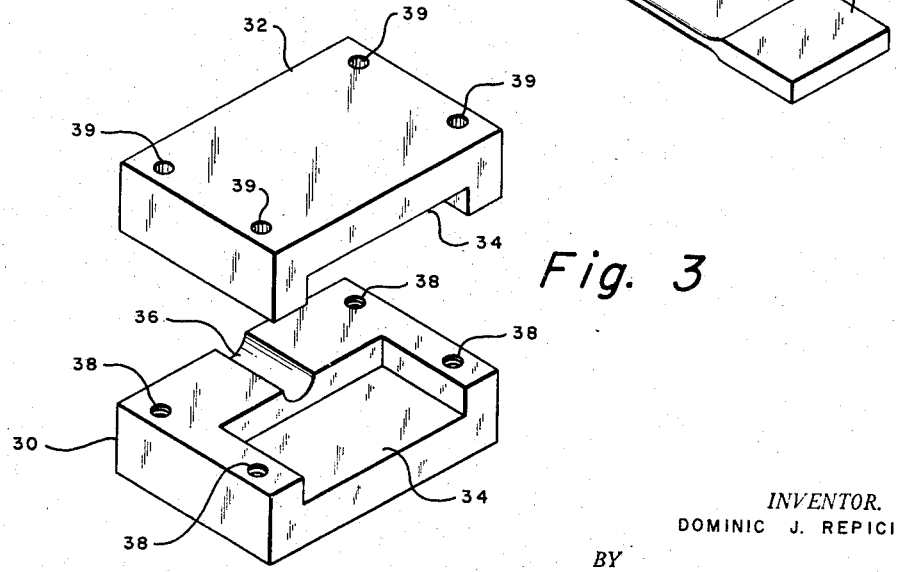
INVENTOR.
DOMINIC J. REPICI
BY
*L. M. Smith Jr.*
ATTORNEYS 2,874,418
Patented Feb. 24, 1959

2,874,418
METHOD OF FABRICATION OF CONDENSER STRIP HYDROPHONES

Dominic J. Repici, Beverly, N. J.

Application May 31, 1957, Serial No. 662,956

5 Claims. (Cl. 18—59)

(Granted under Title 35, U. S. Code (1952), sec. 266)

The invention described herein may be manufactured and used by or for the Government of the United States of America for governmental purposes without the payment of any royalties thereon or therefor.

The present invention relates to a method of sealing a line hydrophone and more particularly to a method of sealing a line hydrophone constructed of a thermoplastic outer wall.

The line hydrophone described herein in connection with the instant method is the subject of a separate patent application Serial No. 664,862, filed June 10, 1957, in the names of John D. Wallace and James H. Stein, and entitled "Line Hydrophone." In the construction and fabrication of this line hydrophone it is required that both ends of the extended outer wall be sealed against leakage, and at least one of the ends be provided with an electrical lead therethrough to be connected to the electrode therein. Prior attempts to seal this hydrophone have either caused damage during sealing or destruction of the bag material adjacent the area where sealing is attempted or resulted in seals which will not withstand the rigorous use intended for the device.

The present invention overcomes the disadvantages of prior attempts at sealing the aforementioned line hydrophone when using an outer bag of thermoplastic material by resorting to a relatively simple technique which is capable of producing each time without endangering the adjacent bag material a seal sufficiently strong to resist the most extreme conditions of operation.

It is a first object of the present invention to provide a method of sealing the end of thermoplastic tubing without destroying the adjacent thermoplastic material.

A further object of the invention is the provision of a method for joining the ends of strip thermoplastic material having an electrical lead extending therethrough.

Another object is to provide a technique for providing a seal for the end of thermoplastic tubing which will resist high fluid pressures and adverse physical conditions.

Still another object of the present invention is the provision of a simplified method for closing the open end of a thermoplastic bag.

The exact nature of this invention as well as other objects and advantages thereof will be readily apparent from consideration of the following specification relating to the annexed drawing in which:

Fig. 1 illustrates an isometric view of a line hydrophone, partially cut away, for which sealing at the ends thereof must be provided.

Fig. 2 illustrates the initial fabrication of the parts before sealing.

Fig. 3 shows an isometric view of the mold disassembled.

Fig. 4 shows a section view of the elements assembled and mounted within the mold of Fig. 3 ready for heating.

Referring now to the drawings, wherein like reference characters designate like or corresponding parts throughout the several views, there is shown in Fig. 1 the line condenser hydrophone 10 in its finished state consisting of a central portion 12 and the sealed end portions 14 and 16. As shown by the cut away section of central portion 12, the interior of hydrophone 10 is constructed of an elongated thin sheet 18 of aluminum or other conductive metal enclosed in a latticed or otherwise woven screen or webbing 20 of dielectric material, such as nylon, plastic or glass. Electrode 18 and screen 20 are fully enclosed in lay flat tubing or an elongated bag 22 which is made from a thermoplastic material such as polyethylene for carrying out this invention. In the particular embodiment illustrated, electrode 18 and screen 20 terminate together in a plane A just short of the end section 14 while an electrical lead 24 insulated by a material identical to that of bag 22 is soldered at the end 25 of electrode 18 and extends through section 14 out of line hydrophone 10 for connection to suitable electrical apparatus, as is understood in the art. It is understood that another electrical connection (not illustrated) is immersed into the same conductive liquid as is hydrophone 10 and forms the other electrode for the latter. This other connection may be attached to the exterior of line hydrophone 10 at some convenient point for this purpose.

The method herein described is directed to sealing end 14 of hydrophone 10 through which lead wire 24 passes as well as the opposite end 16 so that sealing suitable for extreme conditions of use is obtained.

In sealing the polyethylene bag or tubing 22 which is illustrated in Fig. 1, electrode 18 is first slipped into the interior of, or otherwise enclosed by, screen 20 as best shown in Fig. 2. Electrical lead 24 is then soldered or otherwise connected at 25 to the end of electrode 18, with said insulated lead 24 extending to the left as shown. Then an ample portion of the polyethylene lay flat tubing or bag 22 is slipped over the whole assembly in preparation for the sealing action. Note that bag 22 extends beyond the common terminus in plane A of electrode 18 and screen 20.

Fig. 3 illustrates two sections 30 and 32 of the mold which is used in applying heat and forming the seal. It is understood that the mold shown in Fig. 3 is provided with internal heating elements and cooling passages (not illustrated) for permitting heating action to be brought to bear directly on the plastic material contained therein followed after a desired interval with the flow of a fluid such as water for cooling the plastic material in the mold at a rate which is proper for the particular material. Each of the mold sections 30 and 32 is provided with a cavity such as 34 of the shape desired with a semicircular passageway 36 which will permit passage therethrough of the electrical lead 24. Mold sections 30 and 32 are provided with the usual threaded guide pin openings 38 and holes 39, respectively, for bolting; or, they may be hinged together, as understood in the art.

As illustrated in Fig. 4, the end of polyethylene bag 22 to be sealed is placed between mold elements 30 and 32 and additional sheets or strips 40 of the polyethylene material are placed on both sides of polyethylene bag 22 and lead 24 within the mold cavity and passageway 36. Then, mold sections 30 and 32 are lightly closed together while applying heat internally thereof. When the polyethylene material 40 within mold elements 30 and 32 begins to melt, a blast of room temperature or colder air is directed along the top and bottom surfaces of bag 22 in the plane B which is at the end surface of the mold sections 30 and 32 adjacent the open cavity 34 illustrated. This cooling operation is continued for 5 to 10 seconds, after which the mold is then brought together completely by the action of the usual spring biasing apparatus, or other means, causing the plastic material therein to be completely melted. The cooling action of the blast of air prevents the liquid plastic material within the mold cavity 34 from flowing out of the mold and thus prevents transfer of high temperature to the thin polyethylene bag wall in the adjacent area and the consequent bag destruction in this zone.

After a period of 15-30 seconds following termination of the heating action, mold elements 30 and 32 are cooled by conventional means, such as by blower or water jackets in the mold. It is understood that for the molding of section 16, mold elements without a passageway 36 would be utilized.

It has been found that the method herein described will produce a very satisfactory seal for the line hydrophone described, providing perfect sealing under the most adverse conditions of vibration, prolonged periods at low temperature, and high water pressures. Of course, it is understood that the method herein described may be varied to some extent without departing from the principles of this invention. For example, other means than a blast of air may be used for cooling the area adjacent the outside of the mold, such as the use of an additional wall on the mold elements cooled separately during the period that the mold elements are heated for melting the plastic material. Also, electrode 18 and screen 20 may be extended into mold elements 30 and 32 to obtain additional strength adjacent section 14. Furthermore, the method herein described may be found to be applicable to other molding operations wherein similar problems exist.

Hence, it should be understood that the foregoing disclosure relates to only a preferred embodiment of this invention and that numerous modifications or alterations thereof may be made without departing from the spirit and the scope of the invention as set forth in the appended claims.

What is claimed is:

1. A method of sealing the open end of a bag of thermoplastic material having extended through said end an elongated element comprising, in succession, the steps of enclosing said end with additional thermoplastic material partially enclosed by a heating mold, simultaneously applying a relatively light pressure to said additional thermoplastic material and heating said additional material to the melting point, cooling the exposed portion of said additional material and the portion of said bag immediately adjacent said end to cool the exposed surface of said additional material and thereby prevent destruction of the adjacent portion of said bag during sealing, applying a relatively heavy pressure to said additional material to mold said additional material sealably around the end of said bag, and cooling said mold below the melting point of said material over a period sufficiently long to form a solid, sealed end of said bag with said element extending therethrough.

2. A method of sealing an open end of tubing of thermoplastic material having extended therethrough an elongated, metallic element comprising, in succession, the steps of enclosing said tubing end and extended element with additional thermoplastic material partially enclosed by a heating mold, simultaneously applying a relatively light pressure to said additional thermoplastic material and heating said additional material to the melting point of said material, directing a cooling fluid over the exposed portion of said additional material and the portion of said tubing immediately adjacent said end to stabilize the exposed portion of said additional material and thereby prevent destruction of said tubing adjacent said end during sealing, applying a relatively heavy pressure to said additional material to mold said additional material in sealable engagement with the end of said tubing, and cooling said mold below the melting point of said material over a period sufficiently long to form a solid, sealed end of said tubing with said metallic element extending therethrough.

3. A method of sealing an open end of tubing of thermoplastic material having extended therefrom an elongated, metallic element enclosed in the same said material comprising, in succession, steps of enclosing said tubing end and extended element with additional amounts of said thermoplastic material partially enclosed by a heating mold having therein a first cavity encompassing said extended element and a second cavity encompassing the open end of said tubing and spaced from the surface of the tubing along the edges thereof most remote from the open end of said tubing, simultaneously applying a relatively light contact pressure to said additional thermoplastic material and heating said mold to the melting point of said material, directing a cooling fluid over the exposed portion of said additional material and the portion of said tubing immediately adjacent said open end to preclude contact of melted exposed additional material with the immediately adjacent portion of said tubing and thereby prevent destruction of said tubing adjacent said end during sealing, applying a relatively heavy molding pressure to said additional material to force said additional material into molded sealable engagement with the material enclosing said extended element and with the end of said tubing, and thereafter cooling said mold below the melting point of said material over a period sufficiently long to form a solid, sealed end of said tubing with said metallic element enclosed in said material extending from said end.

4. A method of sealing the open end of a bag of thermoplastic material having extended therethrough an elongated, metallic element sheathed in said material, comprising, in succession, steps of enclosing said end and extended element with additional amounts of said thermoplastic material partially enclosed by a heating mold having therein a first cavity encompassing said extended element and a second cavity encompassing the open end of said bag and spaced along peripheral edges thereof from the outer surface of the portion of the bag immediately adjacent the open end thereof, next simultaneously applying a relatively light contact pressure to said additional thermoplastic material and heating said mold to the melting point of said material, then directing a cooling fluid over the exposed portion of said additional material and the portion of said bag immediately adjacent said open end to stabilize the exposed portion of said additional material precluding contact between the heated additional material and the immediately adjacent portion of said bag and thereby prevent destruction of said tubing adjacent said end during sealing, thereafter applying a relatively heavy molding pressure to said additional material to press said additional material into molded sealable engagement with the material sheathing said extended element and the material of the end of said bag, and finally cooling said mold below the melting point of said material over a period sufficiently long to form a solid, sealed end of said bag with said sheathed element extending from said end.

5. The method of sealing against leakage an open end of tubing of thermoplastic material enclosing an electrode in said tubing adjacent said end and a metallic element connected to said electrode and extending from said tubing through said end, comprising, in succession, the steps of enclosing said tubing end and metallic element with added amounts of said thermoplastic material partially enclosed by a heating mold having therein a separate cavity for said metallic element interconnected with a cavity encompassing the open end of said tubing and having an open side most remote from the open end of said tubing with edges spaced a substantial distance from the surface of said tubing, next simultaneously applying a relatively light contact pressure to said additional thermoplastic material and heating said mold to the melting point of said material, subsequently directing a cooling fluid over the exposed portion of said additional material and the portion of said tubing immediately adjacent said open end of said tubing to cool the surfaces of these portions below the melting point and thereby prevent the destruction of said tubing adjacent said end during sealing, thereafter applying a relatively heavy molding pressure to said additional material to press said additional material into molded sealable engagement with the end of said tubing, and finally cooling said mold below the melting point of said material over a period sufficiently long to form a solid, sealed end of said tubing with said metallic element extending from said end and said electrode sealed within said tubing.

References Cited in the file of this patent

UNITED STATES PATENTS 2,169,315    Yngve     Aug. 15, 1939

FOREIGN PATENTS 426,324    Great Britain     1935